US012733647B2

(12) United States Patent
Miccoli et al.

(10) Patent No.: US 12,733,647 B2
(45) Date of Patent: Sep. 15, 2026

(54) FOOD OVEN

(71) Applicants: OXEQUA srls, Frazione Marlia Capannori (IT); Francesco Miccoli, Naples (IT)

(72) Inventors: Francesco Miccoli, Naples (IT); Ivan Mura, San Giuliano Terme (IT)

(73) Assignees: Francesco Miccoli, Naples (IT); OXEQUA SRLS, Franzione Marlia Capannori (IT)

(*) Notice: Subject to any disclaimer, the term of this patent is extended or adjusted under 35 U.S.C. 154(b) by 579 days.

(21) Appl. No.: 18/298,710

(22) Filed: Apr. 11, 2023

(65) Prior Publication Data

US 2024/0341312 A1 Oct. 17, 2024

(51) Int. Cl.
*A21B 1/33* (2006.01)

(52) U.S. Cl.
CPC ...................................... *A21B 1/33* (2013.01)

(58) Field of Classification Search
CPC . A47J 37/0658; F23B 90/06; F23B 2700/013; F23B 60/00; F23B 60/02; F23L 9/02
See application file for complete search history.

(56) References Cited

U.S. PATENT DOCUMENTS 8,459,193 B2 6/2013 Mulcahy
2015/0338104 A1* 11/2015 Lipinski .................. F24B 1/022 126/21 R
2017/0172158 A1* 6/2017 Lipinski .............. A47J 37/0704
2021/0063019 A1* 3/2021 James ..................... F24B 1/202

FOREIGN PATENT DOCUMENTS

CN 206001526 U * 3/2017
DE 20007857 U1 9/2000
EP 3783263 A1 2/2021
GB 2528854 A * 2/2016 .............. F24B 1/202
IT UA20163863 A1 11/2017
WO 2016075646 A1 5/2016
WO WO-2017202853 A1 * 11/2017 ................ C10J 3/74
WO WO-2018131026 A1 * 7/2018 .............. F24B 1/202

OTHER PUBLICATIONS

European Search Report completed Jun. 14, 2022, for IT 202100028829 to OXEQUA SRLS, et al. filed Nov. 12, 2021.

* cited by examiner

*Primary Examiner* — Jorge A Pereiro
(74) *Attorney, Agent, or Firm* — VORYS, SATER, SEYMOUR AND PEASE LLP; Maryellen Feehery Hank

(57) ABSTRACT

A food oven including a cooking compartment of a food; an opening for inserting the food into the compartment; and a pyrolytic burner heating the compartment allowing the food to be cooked.

3 Claims, 2 Drawing Sheets

Figure 1:
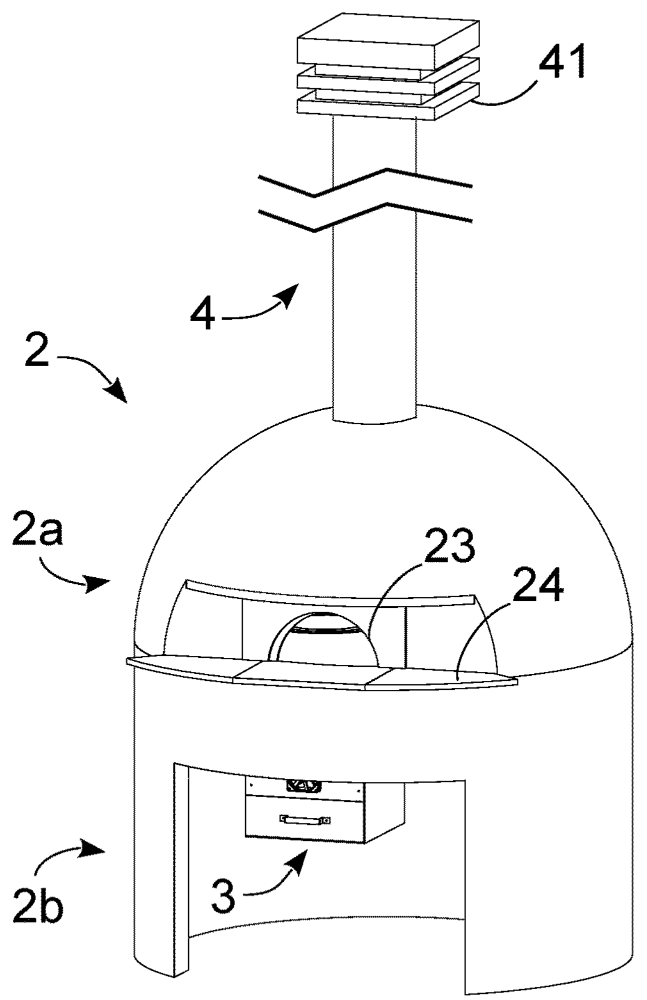
Figure 1:

3a
3
31
22a
31c 32
31a
32a
34
31c
31b
341
32b
342
33b
33
33a
35

FOOD OVEN

The present invention relates to a food oven of the type specified in the preamble to the first claim.

More particularly, the invention relates to an oven to be used, preferably in an exclusive manner, for cooking or heating food and identified in a device defining a chamber in which heat, generated by burning wood or electrically, is collected for cooking or heating food. Preferably, the food oven is a pizza oven.

As is well known, the food ovens and in particular pizza ovens are mainly of three types, gas-fired using a flammable gas burner that must be ignited manually or automatically; electric (mostly muffle, arc and induction) operating with electricity converted into heat by means of resistors; wood-fired using wood as fuel.

Preferably, the pizza oven is wood-burning as the combustion of wood produces fumes that make the pizza of better organoleptic quality. It should be noted that the wood-fired oven can also be used for cooking other foods such as meat, vegetables, fish, bread and desserts.

The wood-fired oven is a brick and masonry construction enclosing a cooking chamber lined with refractory material, i.e. a material capable of withstanding high temperatures for long periods without reacting chemically with the food with which it comes into contact.

The wood-fired oven has a mouth, usually rectangular or semi-circular in shape, into which lit bundles are inserted to heat it until the walls and top turn white, a sign that the oven is ready to cook food. During the baking, the oven is fed with wood in order to maintain the desired temperature.

The known technique described includes some important drawbacks.

In particular, the wood-fired ovens, and food ovens in general, require an exhaust smoke suppressor. This is indispensable in wood-fired ovens where a soot suppressor is required.

A not insignificant drawback is the fact that food ovens have high heating times and high consumption. Specifically, in wood-burning ovens, these aspects result in a build-up of residue inside the oven that reduces the usable free space in cooking and imposes long and laborious oven cleaning.

These aspects also result in particularly high costs.

These reasons have led to a limitation of their use and performance.

In this situation, the technical task at the basis of this invention is to devise a food oven capable of substantially obviating at least some of the aforementioned drawbacks.

In the context of said technical task, it is an important aim of the invention to obtain a food oven which is quick to heat and has a maximum usable free space in cooking with the same dimensions.

Another important purpose of the invention is to realise a food oven with low purchase, operation and maintenance costs.

The specified technical task and purposes are achieved by a food oven as claimed in the appended claim 1. Examples of preferred embodiments are described in the dependent claims.

Figure 2:
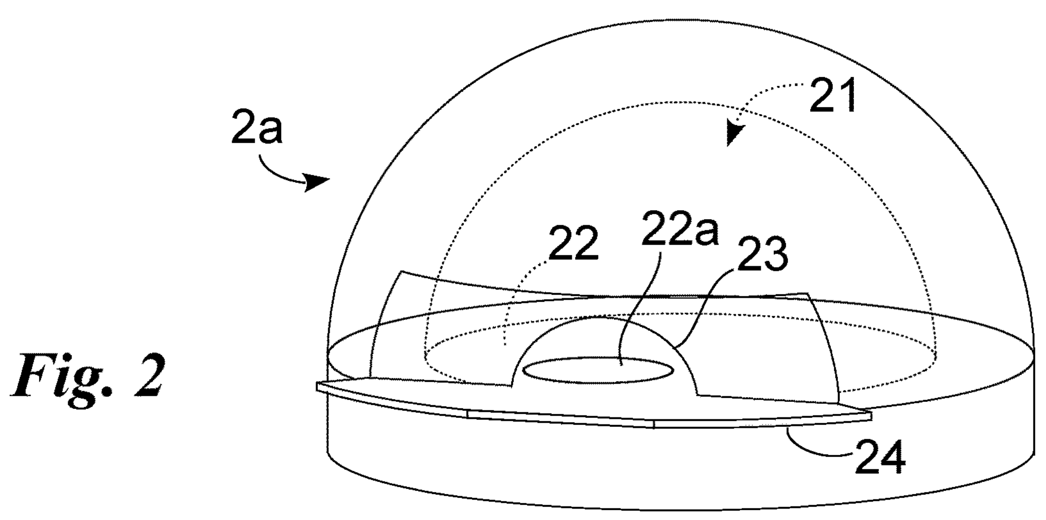
Figure 3:
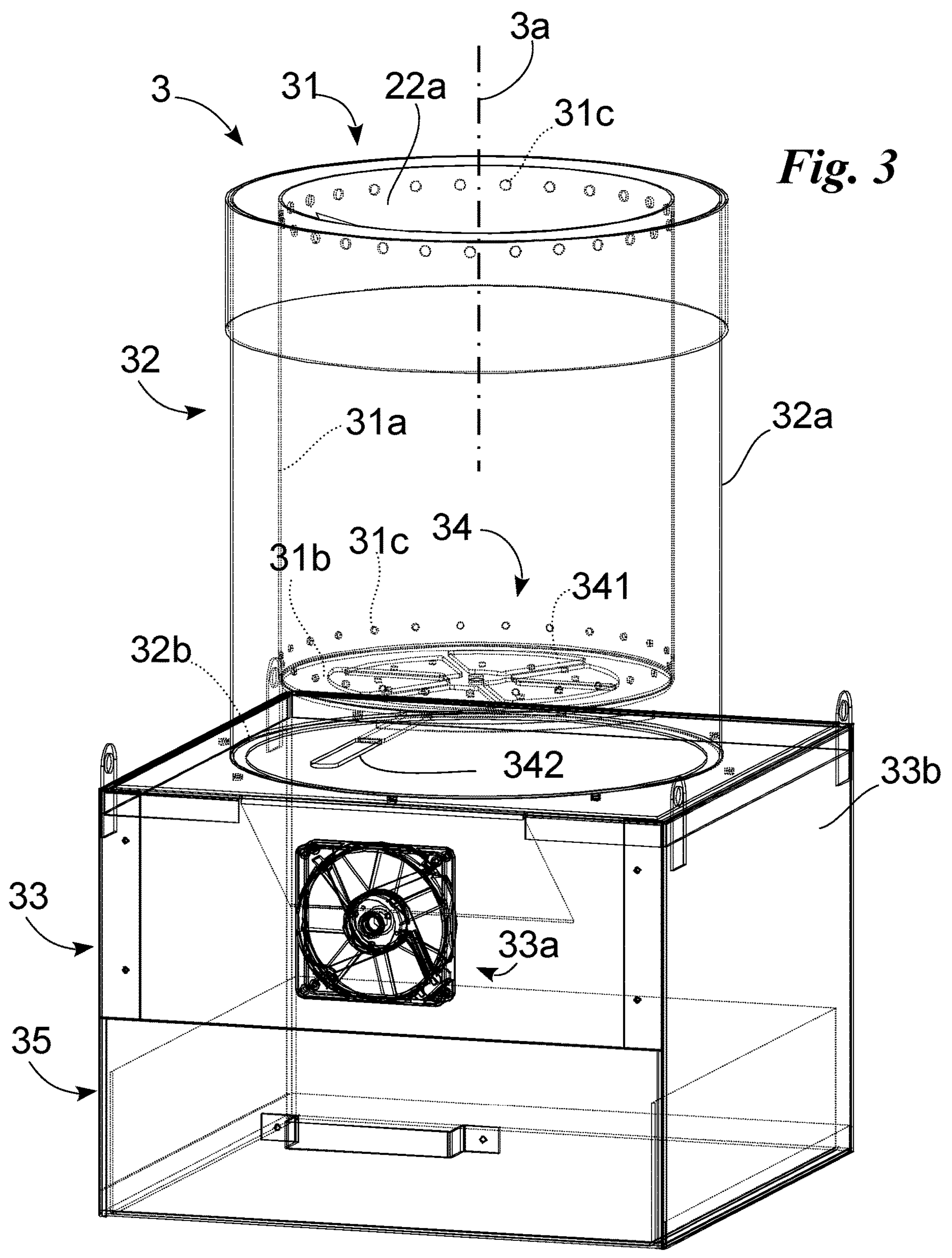

The features and advantages of the invention are hereinafter clarified by the detailed description of preferred implementations of the invention, with reference to the accompanying drawings, in which:

the FIG. 1 shows, to scale, a food oven according to the invention;

the FIG. 2 illustrates, to scale, a food oven assembly; and the FIG. 3 shows, to scale, a second oven assembly according to the invention.

In the present document, the measurements, values, shapes and geometric references (such as perpendicularity and parallelism), when associated with words like "about" or other similar terms such as "approximately" or "substantially", are to be considered as except for measurement errors or inaccuracies due to production and/or manufacturing errors, and, above all, except for a slight divergence from the value, measurements, shape, or geometric reference with which it is associated. For instance, these terms, if associated with a value, preferably indicate a divergence of not more than 10% of the value.

Moreover, when used, terms such as "first", "second", "higher", "lower", "main" and "secondary" do not necessarily identify an order, a priority of relationship or a relative position, but can simply be used to clearly distinguish between their different components.

Unless otherwise indicated, "perpendicular", "transverse", "parallel" or "normal" or other terms of geometric positioning between geometric elements (e.g. axes, directions and straight lines) are to be understood with reference to their reciprocal geometric position between the corresponding projections. These projections are defined on a single plane parallel to the plane(s) of location of said geometric elements.

The measurements and data reported in this text are to be considered, unless otherwise indicated, as performed in the International Standard Atmosphere ICAO (ISO 2533:1975).

Unless otherwise specified, as results in the following discussions, terms such as "treatment", "computing", "determination", "calculation", or similar, refer to the action and/or processes of a computer or similar electronic calculation device that manipulates and/or transforms data represented as physical, such as electronic quantities of registers of a computer system and/or memories in, other data similarly represented as physical quantities within computer systems, registers or other storage, transmission or information displaying devices.

With reference to the Figures, the food oven according to the invention is globally indicated by the number 1.

Preferably, the oven 1 is a wood-fired oven used for baking food and in particular pizzas.

The oven 1 may comprise a base structure 2.

The base structure 2 may comprise a cooking compartment 21.

The cooking compartment 21 is configured to house at least one food item being baked preferably a suitably kneaded flour-based product such as a pizza or bread.

It may define a plane 22 for holding the at least one cooking food item.

The compartment 21 may be at least partially and preferably totally lined with refractory material.

The compartment 21 may have a substantially domed/semi-spherical shape.

The base structure 2 may comprise an mouth 23 for inserting the at least in the compartment 21.

The mouth 23 may be rectangular or semi-circular.

The base structure 2 may comprise a support 24 positioned opposite the mouth 23 with respect to the compartment 21.

The support 24 is adjacent to the mouth 23. It is configured to define a support shelf adjacent to the mouth 23.

The base structure 2 may rest on a walkable plane and the compartment 21 may be spaced apart from said plane. The structure 2 may thus comprise a main body **2*a* (FIG. 2) defining compartment 21 and preferably plane 22, and a support body 2b on which the main body 2a rests and configured to interpose between the main body 21** and the walkable plane.

The support body 2b may define a collection housing for fuel (such as feed wood for the oven 1) and/or the pyrolytic burner below.

The oven 1 may comprise a pyrolytic burner 3 (FIG. 3) heating the compartment 21 allowing the food to be cooked.

The burner 3 is configured to heat the compartment 2a allowing the cooking of the food by exploiting the heat from pyrolytic combustion (i.e. pyrolysis) of preferably solid fuel and in detail wood.

The pyrolysis (or pyrolytic combustion) is a thermo-chemical decomposition process achieved by the application of heat and in the complete absence of an oxidising agent (normally oxygen) as described below.

The pyrolytic burner 3 may be in fluid passage connection with the compartment 21. For this purpose, the plane 22 may comprise an opening 22a west of the compartment 21 in fluid passage connection with the pyrolytic burner 3.

The burner 3 may be flush with the plane 22 so as not to protrude into the compartment 21.

The pyrolytic burner 3 may define a longitudinal axis 3a suitably normal to the plane 22. The burner 3 may comprise a fuel combustion chamber 31. In detail it may be a dual chamber and thus comprise a chamber 31 and an additional chamber 32 at least partially surrounding the chamber 31.

The chamber 31 may define a prevailing axis of development substantially parallel to the longitudinal axis 3a and in detail to that of the supplementary chamber 32. To be precise, the chambers 31 and 32 are coaxial.

The chamber 31 is in fluid passage connection with the chamber 21 and has an access section to the plane 22 at the opening 22a.

It may have a substantially tumbler shape and thus comprising a side wall 31a suitably parallel to the axis 3a and a bottom 31b suitably normal to the axis 3a.

The chamber 31 may be cylindrical. It may have a diameter D and a height H wherein $D<H$ and $D<H>7\times D$. In a preferred embodiment the height H of the chamber 31 follows the relation $2\times D<H>3\times D$, even more preferably the height H is 2.5 times the diameter D of the chamber.

The bottom 31b is opposite the opening 22a to the chamber 31.

The chamber 31 may comprise at least one connector 31c placing the chamber 31 in fluid passage connection with the additional chamber 32.

The at least one connector 31c is configured to place the chambers 31 and 32 in fluid passage communication with each other, allowing the gases (syngas) produced by the pyrolysis of the fuel to pass from the chamber 31 to the supplementary chamber 32 and re-enter the chamber 31 where combustion of the same takes place (suitably in proximity to the opening 22a) generating the characteristic toroidal flame typical of pyrolytic burners. To this end, the at least one connector 31c may comprise one or more holes made in the side wall 31a and/or in the bottom 31b; and in detail first holes of diameter D1 placed at a distance H1 from the opening 22a, and second holes of diameter D2 placed at a distance from the opening 22a suitably greater than H1.

The first holes may have diameter D1 in accordance with the relation $D2\leq D1\geq 3\times D2$; and the second holes have diameter D2 in accordance with $D/50\leq D2\geq D/10$.

The first holes may have said distance H1 according to the relation $H1>2\times D1$, in detail $H1>3\times D1$ and more in detail at a distance H1 equal to $3.5\times D1$.

The second holes may have said distance H2 from the bottom 31b according to the relation $H2>2\times D2$, preferably $H2>3\times D2$, preferably at a distance H2 equal to $3.5\times D2$.

In this way, a high efficiency of the combustion chamber is obtained in relation to the passage of the gases produced by pyrolysis through the holes and their subsequent escape into the upper portion of the burner through the holes, without necessarily having to oversize the circulator (in detail the fan) below introduced.

In a preferred form of embodiment, the diameter D1 is $D2\leq D1\geq 2\times D2$ and preferably D1 is $1.6\times D2$.

In a preferred form of embodiment, the diameter D2 is $D/20\leq D2\geq D/10$ and preferably D1 is D/20.

In addition, the first and second holes may be placed in a ragged pattern along the side wall 31a suitably spaced at an angle between 12° and 36°, in detail between 18° and 30°.

The additional chamber 32 may not be in fluid passage connection with the compartment 21 except through the chamber 31. It does not directly access the compartment 21 through the opening 22a.

It may have a substantially tumbler shape, suitably accommodating the chamber 31 preferably entirely. The additional chamber 32 therefore comprises an additional side wall 32a suitably parallel to the axis 3a and, in some cases, an additional bottom 32b suitably normal to the axis 3a.

The side walls 31a and 32a may be substantially parallel.

The bottoms 31b and 32b may be substantially parallel.

The additional bottom 32b is close to the bottom 31b and opposite the opening 22aa with respect to the chamber 31.

It may be at least partially open defining a passage for discharging pyrolysis residue and/or air into the additional chamber 32 and then into the chamber 31.

The additional chamber 32 may be cylindrical. It may have a diameter B greater than D and in detail between $1.5\times D$ and $2\times D$ (D being the diameter of the first chamber 31). In a preferred embodiment the diameter B is between $1.5\times D$ and $1.7\times D$, even more preferably it is equal to $1.5\times D$.

The pyrolytic burner 3 may comprise an air supply circulator 33 of the burner 3.

The circulator 33 is configured to feed air into the chamber 31 appropriately at the bottom 31b. In detail, it injects air into the additional chamber 32 suitably at the additional bottom 32b.

The circulator 33 may comprise an appropriately electrically driven fan 33a controlling the air circulation; and a casing 33b bound to at least one chamber 31 and/or 32 at a bottom 31b and/or 32b and configured to allow air moved by the fan 33a to reach the chambers 31 and 32.

The pyrolysis burner 3 may comprise a drain 34 of pyrolysis residue from the chamber 31; and a collector 35 of said residue suitably configured to receive said residue by gravity.

The outlet 34 may comprise one or more open sections 341; and at least one closure 342 configured to define an open position in which it does not overlap with the one or more open sections 341 allowing passage of residue from the chamber 31 to the collector 35, and a closed position in which it overlaps with the open sections 341 preventing passage of residue from the chamber 31 to the collector 35.

The closure 342 may comprise a plate hinged to the first chamber 31 so as to rotate about an axis of rotation suitably parallel to the longitudinal axis 3a; and a handle configured to command said plate to rotate by defining the transition between the closed and open positions.

The handle may protrude from the chamber 31 and in detail from the additional chamber 32.

The collector 35 may comprise a drawer for collecting and extracting said residues suitably translatable with respect to the rest of the burner 3 transversely and in detail perpendicularly to the longitudinal axis 3*a*.

The collector is placed on the opposite side of the chamber 31 with respect to the circulator 33 and more precisely to the casing 33*b*.

The oven 1 may comprise a flue 4 configured to evacuate hot gases from the chamber 21.

The flue 4 may comprise a flue pull 41 for example of a known type.

The flue 4 may be without a flue gas extractor.

The operation of the oven 1, described above structurally, is as follows.

Initially, the chamber 21 is brought to the desired temperature using the pyrolytic burner 3.

In detail, fuel (e.g. one or more lumps of wood) is introduced into the chamber 31 through the opening 22*a* so as to reach a desired level. The fuel is ignited, thus generating a quantity of heat that allows the heating of chamber 31, bringing the fuel to the optimal temperature for pyrolysis.

In this operation, thanks to the circulator 33, there is a flow of air which is pushed into the additional chamber 32 and, through the first holes (i.e. at least one connector 31*c*) enters the upper part of the chamber 31 creating a "chimney effect".

The combustion of the fuel generates in the chamber 31 a flammable gas (called syngas and mainly consisting of methane) which at least partially enters by the Venturi effect into the additional chamber 32 through the second holes (i.e. at least one connector 31*c*). Said flammable gas, pushed by said air flow, enters the chamber 31 through the first holes (i.e. at least one connector 31*c*) where it is combusted by the combustion of the fuel, creating a toroidal flame which performs the function of a plug to the entry of air into the chamber 31 and of heating from the part/material below.

It should be noted that the temperature reached inside chamber 31 can be between 400° C. and 1300° C., allowing for complete combustion of the fuel (the gases from the fuel can also be combusted) and thus the formation of a very low percentage of residue thanks to the gasification of the pyrolysis coal residue.

The pyrolysis burner according to the invention is easy to realise on an industrial level. The food oven 1 according to the invention achieves important advantages.

In fact, the oven 1, thanks to the adoption of the burner 3, makes it possible to reach the temperature quickly and, at the same time, to maintain it with a limited supply of fuel, thus reducing the consumption of the oven 1 with respect to the known consumption.

A not insignificant advantage is represented by the fact that the plane 22, not being used to burn wood, has a much larger usable cooking surface than that of the known ovens.

Another advantage lies in the fact that the pyrolytic burner 3 produces a much lower content of residues from the combustion process, thus limiting the time and cost of discharging said residues.

A not insignificant advantage is the fact that burner 3, being wood-fired, enables organoleptic qualities similar to those of wood-fired ovens.

The invention is susceptible to variations within the inventive concept defined by the claims. Within that scope, all details are substitutable by equivalent elements and the materials, shapes and dimensions may be any.

The invention claimed is:

1. A food oven comprising:

a cooking compartment configured to house at least one food being cooked and defining a plane for holding the at least one cooking food item;

a mouth for inserting said food into said compartment; and a pyrolytic burner heating said compartment allowing the cooking of said food and defining a longitudinal axis suitably normal to said plane; wherein said pyrolytic burner comprises a fuel combustion chamber;

an additional chamber surrounding at least in part said combustion chamber;

at least one connector configured to place said fuel combustion chamber in fluid passage connection with said additional chamber;

a base structure comprising said compartment, said mouth and a support plane of said food being cooked; and in which said plane an opening placed said compartment in fluid passage connection with said pyrolytic burner;

wherein said fuel combustion chamber has a substantially tumbler shape and thus it comprises a side wall suitably parallel to said longitudinal axis and a bottom suitably normal to said longitudinal axis;

wherein said additional chamber has a substantially tumbler shape and comprises an additional side wall suitably parallel to said longitudinal axis and an additional bottom suitably normal to said longitudinal axis;

wherein said connector is configured to place said fuel combustion chamber in fluid passage connection with said additional chamber allowing the gases produced by pyrolysis in said fuel combustion chamber of the fuel, enter said additional chamber and then enter said fuel combustion chamber where the combustion of said gases takes place;

wherein said connector comprises first holes placed at a distance H1 from said opening and second holes placed at a distance from said opening greater than H1 and distance H2 from the bottom;

wherein said pyrolytic burner comprises an air supply circulator injecting air into the additional chamber suitably at the additional bottom and then generating a flow of air which is pushed into the additional chamber defining a Venturi effect that supports the passage of said gases;

through said second holes from said fuel combustion chamber to said additional chamber and then;

through said first holes from said additional chamber to said fuel combustion chamber where said gases are combusted by the combustion of the fuel, creating a toroidal flame which performs the function of a plug to the entry of air into said fuel combustion chamber and of heating from a part/material below;

wherein said pyrolysis burner comprises an outlet of pyrolysis residue from said fuel combustion chamber and a collector of said residue suitably configured to receive said residue by gravity, wherein said outlet comprises one or more open sections and at least one closure configured to define an open position in which said at least one closure does not overlap with said one or more open sections allowing passage of residue from said fuel combustion chamber to the collector, and a closed position in which said at least one closure overlaps with said one or more open sections preventing passage of residue from said fuel combustion chamber to the collector;

wherein said collector comprises a drawer for collecting and extracting said residues suitably translatable with respect to the rest of said burner transversely to said longitudinal axis; and wherein said collector is placed on the opposite side of said fuel combustion chamber with respect to the circulator.

2. The food oven according to claim 1, in which said fuel combustion chamber is cylindrical and has a diameter D and a height H comprised between D and 7×D; and in which said additional chamber is cylindrical and has a diameter B comprised between 1.5 and 2 times D.

3. The food oven according to claim 1, wherein said opening places said compartment in fluid passage connection with said fuel combustion chamber.

* * * * *